United States Patent [19]
Simpson et al.

[11] Patent Number: 6,149,188
[45] Date of Patent: Nov. 21, 2000

[54] SELF-ALIGNING ENERGY ABSORBING PLATE FOR A STEERING WHEEL

[75] Inventors: James Jeffrey Simpson, Fairborn; Andrew James Barr, Vandalia; Duane David Williams, Beavercreek; Rale Richard Wolf, Bellbrook; Barry Christian Worrell, Centerville, all of Ohio

[73] Assignee: General Motors Corporation, Detroit, Mich.

[21] Appl. No.: 09/185,809

[22] Filed: Nov. 4, 1998

[51] Int. Cl.⁷ .................................................. B60R 21/16
[52] U.S. Cl. ............................................. 280/731; 280/750
[58] Field of Search .................................. 280/731, 728.2, 280/750

[56] References Cited

U.S. PATENT DOCUMENTS 5,470,099  11/1995  Williams .
5,755,458   5/1998  Donovan ............................... 280/728.2
5,765,865   6/1998  Nagata et al. ........................... 280/731

*Primary Examiner*—Paul N. Dickson
*Assistant Examiner*—Faye M. Fleming
*Attorney, Agent, or Firm*—Kathryn A. Marra

[57] ABSTRACT

A steering wheel assembly has a mounting plate which secures a molded steering wheel to a steering shaft in a vehicle. The mounting plate has a pair of slots having respective longitudinal axes which intersect the plane of the steering wheel at a six o'clock position with an included angle of approximately ninety (90) degrees. The longitudinal axis of one of the slots intersects a transverse axis of the steering wheel at a forty-five (45) degree angle at a three o'clock position and the longitudinal axes of the other slot similarly intersects the transverse axis at the nine o'clock position. The slots are effective to control energy absorption and deflection of the steering wheel when it is impacted at a position other then the twelve o'clock position.

10 Claims, 3 Drawing Sheets

SELF-ALIGNING ENERGY ABSORBING PLATE FOR A STEERING WHEEL

TECHNICAL FIELD

This invention relates to steering wheel assemblies having a mounting plate.

BACKGROUND OF THE INVENTION

It is well known in the prior art to have a steering wheel onto which an air bag assembly is centrally mounted. The steering wheel of a passenger vehicle can be impacted by the operator under certain circumstances. The positioning of the steering wheel has generally been accomplished by adding preformed spokes to the molded wheel. The spokes control the amount of bending at the wheel and the amount of energy absorbed by the wheel during an impact event.

The use of spokes requires a molding process that is compatible with the insertion of preformed steel members. The spokes must be preformed in an operation separate from the molding operation and retained in position during the molding process.

SUMMARY OF THE INVENTION

It is an object of the present invention to provide an improved steering wheel assembly for a passenger vehicle. In one aspect of the present invention, an energy absorbing plate is secured to a molded wheel in a steering system. In another aspect of the present invention, the steering system has an air cushion mounted therein and the energy absorbing plate and the wheel cooperate to align the wheel and the air cushion with an occupant during an impact with the wheel.

In yet another aspect of the present invention, the energy absorbing plate has a pair of slots formed therein to control bending of the wheel during impact. In still another aspect of the present invention, the formed slots have longitudinal axes intersecting the steering wheel approximately at the six o'clock position. In a further aspect of the present invention, the slots diverge from the six o'clock position toward the three and nine o'clock positions.

The steering wheel assembly is comprised of a molded wheel assembly in which is housed an air bag or cushion assembly. The lower portion of the steering wheel assembly includes an energy absorbing mounting plate which is secured to the molded wheel assembly and supports the inflator for the air bag assembly. The mounting plate has a splined opening in which a steering shaft is drivingly connected when the steering wheel assembly is mounted in a vehicle.

The steering wheel assembly has a pair of orthogonal axes which are disposed in planes substantially parallel with planes containing the longitudinal axis and the transverse axis of the vehicle respectively. The mounting plate has stress relief slots formed therein which have longitudinal axis intersecting the steering wheel assembly axis that is parallel with the longitudinal axis of the vehicle. The intersection of these axes occurs at approximately the six o'clock position of the steering wheel. The axes of the slots diverge from the six o'clock position toward the three o'clock and nine o'clock positions respectively.

The slots assist in controlling the bending attitude of the wheel in the steering wheel assembly when the wheel is impacted at the three, six, or nine o'clock position. The deflection of the wheel is controlled to maintain proper alignment of the air bag assembly and the wheel during impact by the operator. The mounting plate also absorbs significant energy during impact to reduce the deceleration of the operator during impact. The wheel is sufficiently flexible in the twelve o'clock position such that the energy absorbing and bending features of the mounting plate are not needed when this position of the steering wheel assembly is impacted.

DESCRIPTION OF AN EXEMPLARY EMBODIMENT

Figure 1:
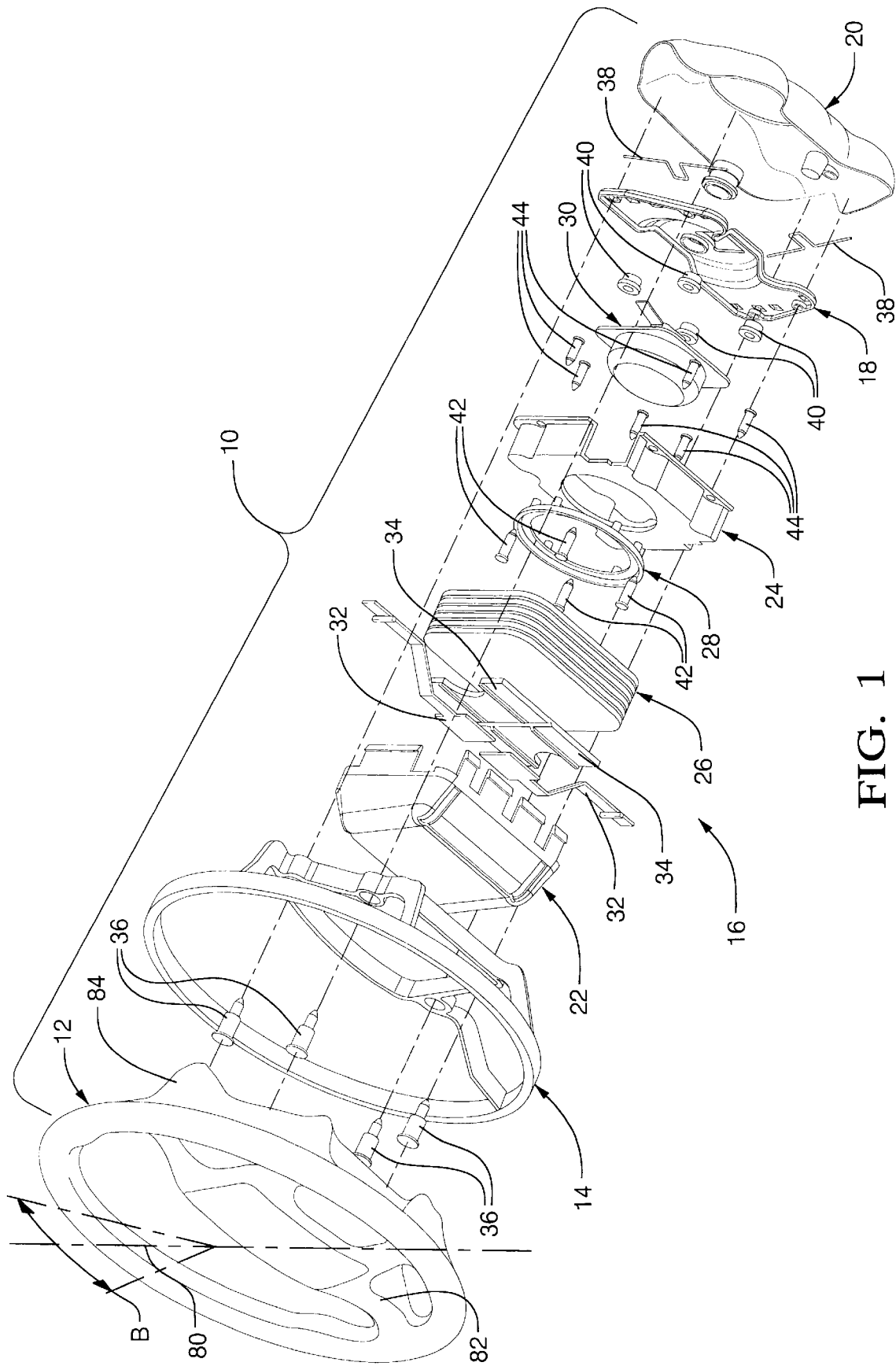
FIG. 1 is an exploded view of a steering wheel assembly incorporating the present invention.

A steering wheel assembly 10 is depicted in exploded view in FIG. 1. The assembly 10 includes a molded steering wheel 12, a steering wheel insert 14, an air bag assembly 16 a mounting plate 18, and a shroud 20. The wheel insert 14, while shown separately, is molded into the molded wheel 12. The air bag assembly 16 is a conventional component in the steering wheel assembly. The assembly 16 includes a container 22 which is secured to a base plate 24. A cushion assembly or air bag 26 and a cushion retainer 28 are also secured to the base plate 24 inside of the container 22. An inflator assembly 30 is secured to the base plate 24. As is well known, the inflator has an electronic igniter control that activates the inflator assembly 30 such that a gas is generated to fill and expand the air bag 26 in the event that the vehicle is impacted by an external object.

Also housed in the container 22 are a pair of switch elements 32 and reaction plates 34. These elements 32 and plates 34 are components in the horn, not shown, for the vehicle.

The molded wheel 12 and insert 14 are secured to the mounting plate 18 by a plurality of fasteners or attachment pins 36. The fasteners 36 pass through bushings 40 in the mounting plate 18 and are held in position by a pair of retainer springs 38. The cushion assembly 26, cushion retainer 28, base plate 24 and inflator assembly 30 are secured to the together and to the mounting plate 18 by a plurality of fasteners 42 and 44.

Figure 4:
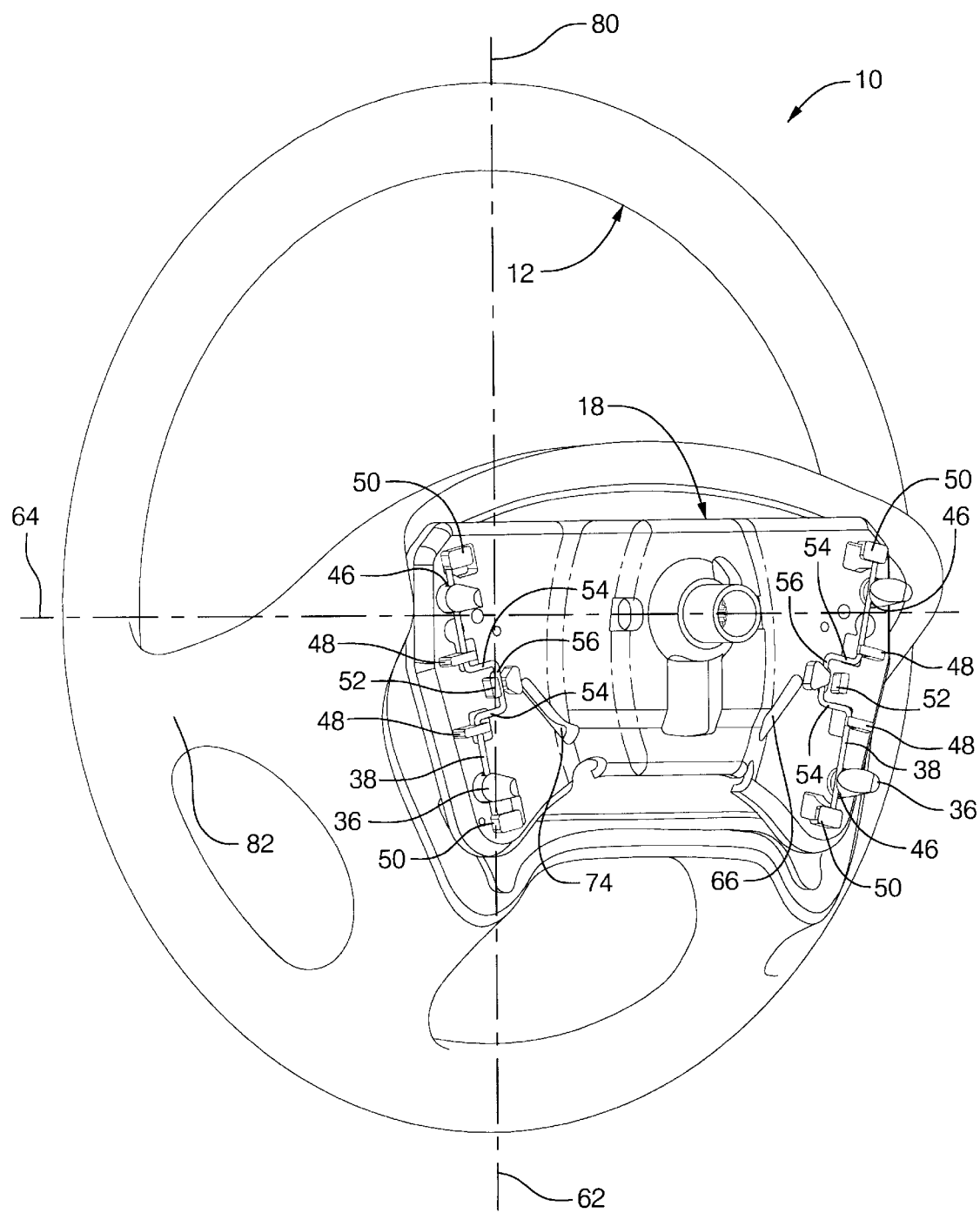
FIG. 4 is an isometric view of the steering wheel assembly as viewed from the bottom.

As best seen in FIG. 4, the attachment pins 36 each have a slot 46. The mounting plate 18 has tab portions 48, and 50 and a latch portion 52. The springs 38 each have a pair is arms 54 extending from a center portion 56. The arms 54 engage in the slots 46, and the tabs 48 and 50. The center portions 56 are retained by the latch portions 52. This mechanism secures the mounting plate 18 with the molded wheel 12. The mounting plate 18 is attached to the vehicle steering shaft, not shown, at a spline 58 formed in the mounting plate 18 by a conventional fastener, not shown.

Figures 2, 3:
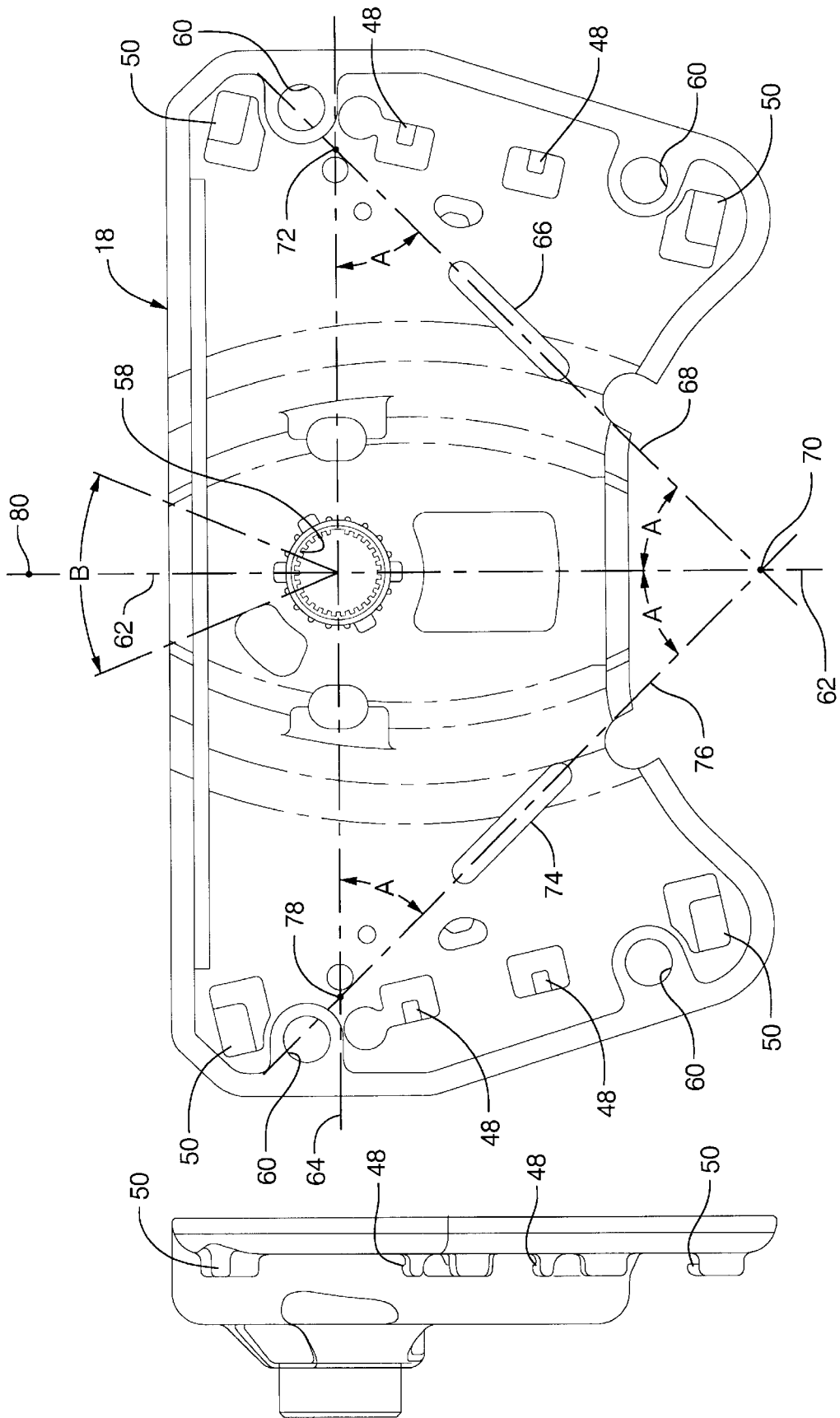
FIG. 2 is a plan view of a mounting plate which is a component of the steering wheel assembly in FIG. 1.
FIG. 3 is a side view of the mounting plate.

The mounting plate 18 (FIGS. 3 and 4) has openings or apertures 60 through which the attachment pins 36 extend. The mounting plate 18 has a first axis 62, commonly termed the six o'clock/twelve o'clock axis, and a second axis 64, commonly termed the three o'clock/nine o'clock axis. A first slot 66 is formed in the mounting plate 18 such that a longitudinal axis 68 thereof intersects the axis 62 at a six o'clock position 70 and the axis 64 at a three o'clock position 72. The angle of intersection A is in the range of approximately forty (40) to fifty (50) degrees and is preferably forty-five (45) degrees. A second slot 74 is formed in the mounting plate 18 such that a longitudinal axis 76 thereof intersects the axis 62 at the position 70 and the axis 64 at a nine o'clock position 78. The angle of intersection A is the same as that for the axes 62, 64 and 68.

When the vehicle is traveling a straight line, the axis 62 will be directed substantially fore and aft of the vehicle in a plane parallel with a plane of the longitudinal axis of the vehicle. The axis 64 will be directed substantially transverse to the vehicle in a plane parallel with a planed of the transverse axis of the vehicle. During a steering maneuver, the axes 62 and 64 are rotated about the central axis of the spline 58. Thus the positions 70, 72 and 78 are rotated from the positions shown. During an unintended deceleration, the steering wheel 12 may be impacted by the operator at a twelve o'clock position 80. The impact will be supported over approximately thirty (30) degrees as represented by angle B.

If the steering wheel assembly 10 is in the position shown, the molded steering wheel 12 will be deflected, during impact, between a pair of spokes 82 and 84. During the impact, the steering wheel 12 will be deflected thereby absorbing energy and controlling deceleration of the torso. Also the deflection will align the steering wheel 12 and the air bag 26 with the occupant of the vehicle.

However, during a steering maneuver, the steering wheel assembly 10 is rotated such that any of the positions 70, 72 or 78 can be aligned with the normal twelve o'clock position 80. The same bending and energy absorption of the steering wheel assembly 10 is desired regardless of the angular position of the steering wheel assembly 10. The slots 66 and 74 will accommodate the desired steering wheel deflection, along the axes 68 and 76 when the position 80 is rotated significantly away its location on axis 62 above the center of the steering wheel 12. The disposition of the slots 66 and 74 maintain sufficient stiffness in the mounting plate 18 such that the plate 18 does not deflect when the steering wheel is in the straight ahead driving position shown.

What is claimed:

1. A steering wheel assembly for a vehicle comprising:
   a wheel having first and second intersecting axes;
   an air bag assembly mounted in the wheel;
   a mounting plate secured therebetween said wheel and a steering mechanism of the vehicle, said mounting plate having axes disposed coplanar with said first and second axes respectfully;
   a first deformation controlling slot formed in said mounting plate and having a longitudinal axis extending along an entire length of the first deformation controlling slot, the longitudinal axis being disposed at a predetermined angle relative to both the first and intersecting said axes of said mounting plate at first and second positions; and
   a second deformation controlling slot formed in said mounting plate and having a longitudinal axis extending along an entire length of the second deformation controlling slot, the longitudinal axis being disposed at a predetermined angle relative to both the first and intersecting said axes of said mounting plate at said first position and at a third position.

2. The steering wheel assembly defined in claim 1 wherein said air bag is disposed between said mounting plate at a rim of said steering wheel; said first position is disposed in the plane of the first axis and said second and third positions are disposed in the plane of the second axis and wherein the plane of second axis is substantially parallel with a transverse plane of the vehicle.

3. A steering wheel assembly for a vehicle comprising:
   a wheel having first and second perpendicular axes intersecting said wheel at a three o'clock, six o'clock, nine o'clock and twelve o'clock positions;
   a mounting plate secured between said wheel and a steering wheel mechanism of the vehicle, said mounting having axes disposed coplanar with said first and second axes respectively;
   a first deformation controlling slot formed in said mounting plate and having a longitudinal axis extending along an entire length of the first deformation controlling slot, the longitudinal axis being disposed at a predetermined angle relative to both the first and intersecting said axes of said mounting plate at first and second positions; and
   a second deformation controlling slot formed in said mounting plate and having a longitudinal axis extending along an entire length of the second deformation controlling slot, the longitudinal axis being disposed at a predetermined angle relative to both the first and intersecting said axes of said mounting plate at said first position and at a third position;
   said first position being disposed between a center of the steering wheel and the six o'clock position.

4. The steering wheel assembly for a vehicle defined in claim 3 comprising:
   said first and second predetermined angles being equal;
   said second position being disposed between the center of the steering wheel and said three o'clock position; and
   said third position being disposed between the center of the steering wheel and said nine o'clock position.

5. The steering wheel assembly for a vehicle defined in claim 3 comprising:
   said steering wheel having a first spoke between said three o'clock and twelve o'clock positions and a second spoke between said nine o'clock and twelve o'clock positions to provide deflection support at a rim of said wheel during an impact at the twelve o'clock position;
   said first and second slots cooperating to provide deflection support and control of said steering wheel during an impact at any of the three o'clock, six o'clock and nine o'clock positions.

6. The steering wheel assembly for a vehicle defined in claim 5 comprising:
   said first and second predetermined angles being in the range of forty to fifty degrees.

7. The steering wheel assembly for a vehicle defined in claim 5 comprising:
   said first and second predetermined angles being forty-five degrees.

8. The steering wheel assembly defined in claim 5 wherein said first and second slots cooperate to provide deflection support and control of said steering wheel when said steering wheel has been adjusted so that one of the first, second, and third positions of the mounting plate has assumed the normal twelve o'clock position.

9. The steering wheel assembly defined in claim 5 wherein each of the first and second deformation controlling slots has an oblong shape.

10. The steering wheel assembly defined in claim 5 wherein the mounting plate has a plurality of openings formed therein for receiving fasteners so as to attach the steering wheel to the mounting plate.

* * * * *